June 29, 1965 H. J. WENDT ETAL 3,192,051
METHOD OF PREPARING A BONELESS FOWL ROAST WITH FILLED CAVITY
Filed Aug. 30, 1962
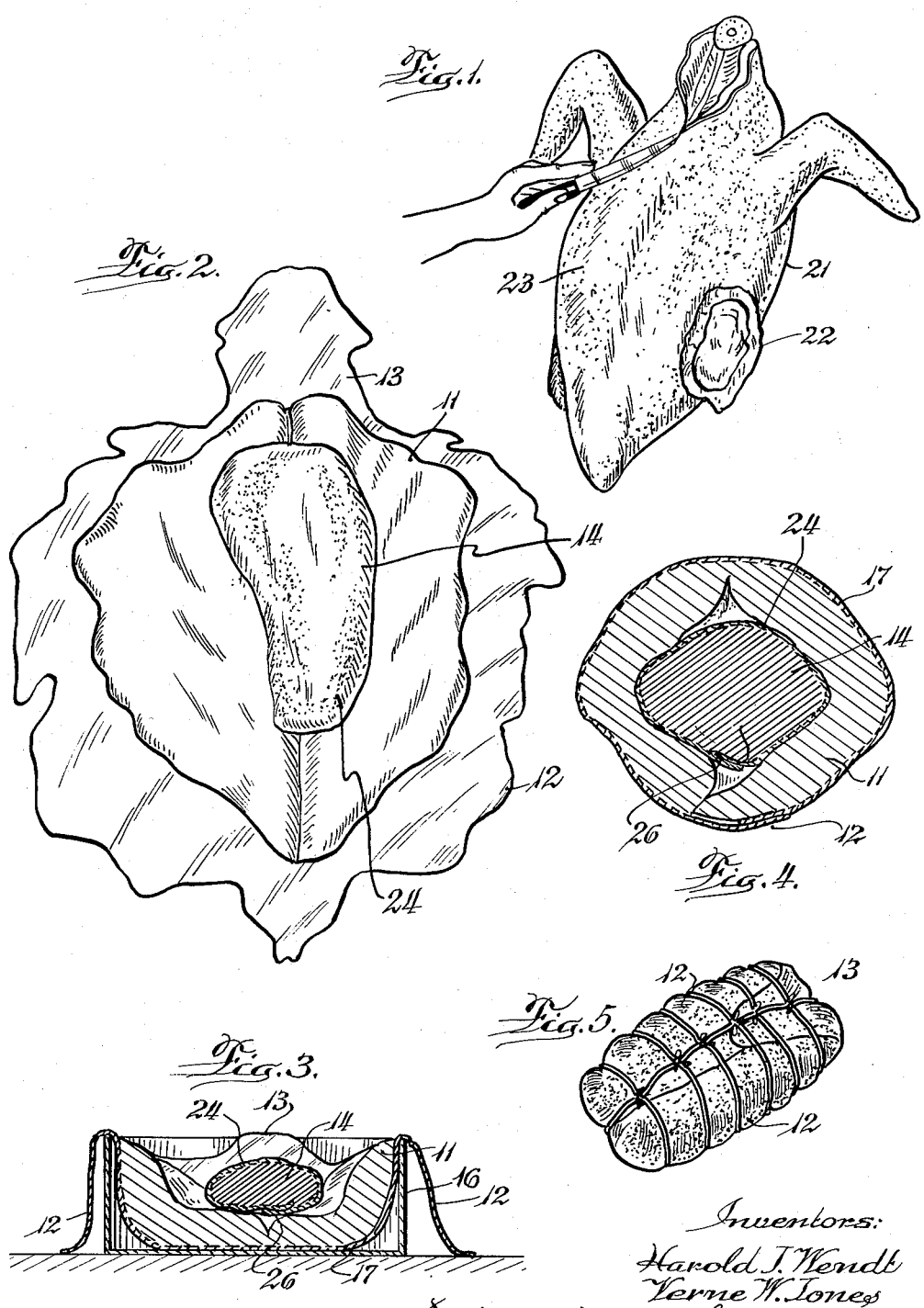
Inventors:
Harold J. Wendt
Verne W. Jones
By Schneider, Dressler, Goldsmith & Clement
Attorneys.

3,192,051
METHOD OF PREPARING A BONELESS FOWL ROAST WITH FILLED CAVITY
Harold J. Wendt, Omaha, and Verne W. Jones, Nebraska City, Nebr., assignors to Ocoma Foods Company, a corporation of Nebraska
Filed Aug. 30, 1962, Ser. No. 220,421
5 Claims. (Cl. 99—107)

This invention relates to a boneless fowl roast and to a method of processing dressed fowl to prepare boneless fowl products capable of being sliced easily.

Fowl such as turkeys, geese and chicken are bulky to prepare and difficult to carve after preparation. For these reasons it has been found desirable to have boneless fowl roasts prepared by commercial producers to enable a consumer to roast or broil a compact product which may be sliced easily after cooking. In our copending U.S. patent application, Serial No. 220,497, filed concurrently herewith, we have disclosed a boneless fowl roast wherein separate large portions of fowl meat are held together by fowl skin, including normally adherent skin on the fowl portions and including skin flaps which overlap and envelop other portions of the meat.

In a specific embodiment of the invention of the copending application a turkey half breast is severed from the carcass of the bird with its normally adherent breast skin attached and with one or more free skin flaps of adjoining skin also attached. A portion of turkey thigh meat is applied to the inner portion of the breast meat with the skin of thigh meat facing outwardly. The skin flaps on the breast meat are wrapped around the thigh meat to overlap the adherent thigh skin and the composite is tied together so that the inner surfaces of the skin flaps are compressed against the thigh meat and skin.

When care has been taken to retain on the skin flaps all of the normally underlying membraneous tissues, the composite becomes self-adherent upon heating due to the naturally adhesive properties of the membraneous subcutaneous tissues. The skin wrapping shrinks during heating and compresses the meat portions into a compact mass substantially free of voids.

The invention of the aforementioned copending application is well suited for the preparation of relatively small, or moderately sized fowl roasts. However, for larger roasts the adherence between the skin flaps and their underlying meat and the compression of the meat portion by skin shrinkage may not be sufficient to prevent separation of the meat portions upon slicing since there is little or no adherence between the meat portions themselves.

In accordance with the present invention there is provided a fowl roast comprising at least two large meat portions wherein there is adherence between the meat portions and their overlying skin and also between the meat portions themselves.

Specifically, the invention involves a method of preparing a unitary boneless fowl roast which comprises removing from a fowl carcass a portion of the flesh thereon while maintaining on said flesh its normal adhering skin and maintaining attached to and integral with said adhering skin at least one skin flap comprising free skin, said skin flap including substantially all of the subcutaneous membraneous tissue normally adjacent thereto, and shaping said portion of flesh to form a cavity therein; removing from a fowl carcass a second portion of flesh while maintaining on said flesh its normally adhering skin and maintaining attached to and integral with said adhering skin at least one skin flap comprising free skin, said skin flap including substantially all of the subcutaneous membraneous tissue normally adjacent thereto, wrapping said skin flap of said second portion of flesh over said second portion with the inner portion of said skin flap and said subcutaneous tissue in contact therewith, thereby enveloping said second portion, placing the thus enveloped second portion within the cavity of said first-named portion of flesh, wrapping said skin flap of said first-named portion over said first-named portion with the inner portion of said skin flap and said subcutaneous tissue in contact therewith and thereby enveloping said first-named portion in skin and maintaining said skin flap of said first-named portion compressed against said first-named portion.

In accordance with this invention it has been found that the external surface of the skin of a fowl can act as a means of attachment to meaty tissue compressed against it and heated. Thus, when a second portion of fowl flesh is enveloped in skin prior to being inserted into the cavity of the first portion of fowl flesh and the composite is tied tightly to bring the inner meaty surfaces in the cavity into compression against the skin enveloping the inserted meat portion, and the composite is heated, a natural adherence takes place between the exterior surface of skin around the second portion and the meaty inner surfaces of the first portion. There is also a natural adherence between the interior surface of the skin around the second portion and its underlying meat both at portions where adhering skin was left on the second portion and on portions where a skin flap with its underlying membraneous tissue was compressed against the second portion during heating. Thus, the skin wrapper around the second portion of meat acts as a binder to both its underlying second portion and its surrounding first portion of meat to make up a self-adhering compact roast.

The invention is more fully described with reference to the drawing of which:

FIGURE 1 is a perspective view showing the initial cutting of the torso of the bird;

FIGURE 2 is a plan view of the whole breast of the bird positioned with its adherent skin downward and having a second boneless portion lying thereabove;

FIGURE 3 is a cross sectional view of the whole breast and second meat portions of the fowl in a mold ready for wrapping;

FIGURE 4 is a cross sectional view of the composite fowl structure of this invention; and FIGURE 5 is a perspective view of the composite fowl roast after cooking.

In accordance with one embodiment of this invention, a dressed turkey 21, for example, is prepared for the process of this invention by first removing the drumsticks from their place of attachment 22. The back of the turkey 23 is then slit, as shown in FIGURE 1, and the skin on the back is scored and loosened, taking care to leave the subcutaneous membraneous tissue with the free skin. The whole breast of the turkey is then cut away from the keel bone and removed together with the skin flaps from the severed back skin. A fatty material called "blubber" is then stripped away from the skin attached to the whole breast where it joins the neck. Care is taken to leave the subcutaneous membraneous tissue intact on the skin. The breast meat will then have, in addition to its normally adhering skin, its skin flaps derived from the back portion of the bird and another skin flap derived from at or near the neck portion.

The right and left thigh meat portions are also removed from the bird with their adhering skin attached and with a skin flap of back skin with its subcutaneous membraneous tissue attached. In accordance with one embodiment of this invention, one or both thigh meat portions are inserted within the cavity formed when the whole breast is folded on itself along the portion severed from the keel bone.

In accordance with another embodiment of this invention the portion of meat inserted into the whole breast cavity is a half breast obtained from another turkey carcass. In this case the half breast is removed with a flap of back skin and a flap of neck skin, as described above.

The second portion of meat, if it is a half breast or a single thigh portion is wrapped by its skin flaps to envelop as much of the meaty tissue as possible therein. If two thigh portions are to be inserted within the whole breast cavity, each thigh portion is wrapped in its skin flap and the portions are held adjacent to each other with their natural adherent skin facing outward.

In FIGURE 2, the whole breast meat 11 is shown in plan view with its adherent skin 17 (not shown in FIGURE 2) downward and with its skin flaps 12 derived from the skin from the back of the bird and skin flap 13 derived from the skin on the neck of the bird. The second portion of meat, in this case half breast 14, wrapped in its adherent skin 24 and overlying skin flaps 26 (not shown in FIGURE 2) is laid into the center of the breast meat.

The whole breast and the overlying half breast are laid in a mold 16 with skin flaps 12 and 13 hanging over the edge of the mold as shown in cross section in FIGURE 3. The adherent whole breast skin 17 is placed downward. The whole breast is folded over itself to envelop the half breast, as shown in cross section in FIGURE 4. As illustrated in cross section the boundary between adherent skin and its underlying meat is shown by dotted line.

The composite is then tied longitudinally and laterally. The tying holds the composite structure in compressed relationship until the cooking achieves the necessary adherence to make a unitary product.

When the roast is precooked by the processor, it is wrapped in metal foil and roasted in an oven for the first stage of roasting. Typically, a composite roast of a full breast and a half breast from turkeys weighing from about 24 pounds to about 28 pounds full dressed may be roasted in a 275° F. oven for a period of 5 hours or until the roast reaches an internal temperature of about 170° F. The metal foil is then opened and the tying strings are cut before the turkey is put back into the oven for browning. The cooking achieves internal adherence between the half breast and its overlying skin, between the half breast skin and its overlying whole breast meat and both the whole breast meat and its overlying skin.

After browning, the product is cooled, placed in a plastic bag with some of its natural cooking juices and frozen.

While the invention has been described above with reference to a boneless turkey roast composited from a whole breast and a half breast, it is to be understood that the principles of this invention are applicable to other types of fowl and to other portions thereof. The invention is also applicable for the preparation of uncooked boneless fowl roasts wherein the fowl portions are held in compressive relationship by tying until cooking by the consumer effects the adherence desired.

The above detailed description of this invention has been given for clearness of understanding only. No unnecessary limitations should be understood therefrom, as modifications will be obvious to those skilled in the art.

We claim:

1. A method of preparing a unitary boneless fowl roast which comprises removing from a fowl carcass a portion of the flesh thereon while maintaining on said flesh its normally adhering skin and maintaining attached to and integral with said adhering skin at least one skin flap comprising free skin, maintaining on said skin flap substantially all of the subcutaneous membraneous tissue normally adjacent thereto, and shaping said portion of flesh to form a cavity therein; removing from a fowl carcass a second portion of flesh while maintaining on said flesh its normally adhering skin and maintaining attached to and integral with said adhering skin at least one skin flap comprising free skin adjacent thereto, maintaining on said second-named skin flap substantially all of the subcutaneous membraneous tissue normally adjacent thereto, wrapping said second-named skin flap over said second portion with the inner portion of said skin flap and said subcutaneous tissue in contact therewith and thereby enveloping said second portion in skin, placing the thus enveloped second portion within the cavity of said first-named portion of flesh, wrapping said skin flap of said first-named portion over said first-named portion with the inner portion of said skin flap and said subcutaneous tissue in contact therewith and thereby enveloping said first-named portion in skin and maintaining said skin flap of said first-named portion compressed against said first-named portion.

2. A method of preparing a unitary boneless turkey roast which comprises removing from a turkey carcass a whole breast portion thereof while maintaining on said breast portion its normally adhering skin and maintaining attached to and integral with said adhering breast skin at least one skin flap comprising free skin, maintaining on said skin flap substantially all of the subcutaneous membraneous tissue normally adjacent thereto, shaping said breast portion of flesh to form a cavity therein; removing from a turkey carcass a second portion of flesh while maintaining on said flesh its normally adhering skin and maintaining attached to and integral with said second-named adhering skin at least one skin flap comprising free skin, maintaining on said second-named skin flap substantially all of the subcutaneous membraneous tissue normally adjacent thereto, wrapping said second-named skin flap over said second portion with the inner portion of said skin flap and said subcutaneous tissue in contact therewith and thereby enveloping said second portion in skin, placing the thus enveloped second portion within the cavity of said whole breast portion of flesh, wrapping said first-named skin flap over said whole breast portion with the inner portion of said skin flap and said subcutaneous tissue in contact therewith to substantially completely envelope said whole breast portion and maintaining said first-named skin flap compressed against said whole breast portion, and the inner surface of said whole breast portion compressed against said second portion.

3. A method of preparing a unitary boneless turkey roast which comprises removing from a turkey carcass a whole breast portion thereof while maintaining on said breast portion its normally adhering skin and maintaining attached to and integral with said adhering breast skin a back skin flap comprising free skin and a neck skin flap comprising free skin, maintaining on said skin flaps substantially all of the subcutaneous membraneous tissue normally adjacent thereto, shaping said breast portion of flesh to form a cavity therein; removing from a turkey carcass a half breast portion of flesh while maintaining on said half breast its normally adhering skin and maintaining attached to and integral with said second-named adhering skin at least one skin flap comprising free skin, maintaining on said second-named skin flap substantially all of the subcutaneous membraneous tissue normally adjacent thereto, wrapping said second-named skin flap over said half breast with the inner portion of said skin flap and said subcutaneous tissue in contact therewith and thereby enveloping said half breast in skin, placing the thus enveloped half breast within the cavity of said whole breast portion of flesh, wrapping said back and neck skin flap of said whole breast portion over said whole breast with the inner portion of said skin flap and said subcutaneous tissue in contact therewith to substantially completely envelope said whole breast and maintaining said back and neck skin flaps compressed against said whole breast portion, and the inner surface of said whole breast portion compressed against said half breast.

4. A method of preparing a unitary boneless turkey roast which comprises removing from a turkey carcass a whole breast portion thereof while maintaining on said breast portion its normally adhering skin and maintaining attached to and integral with said adhering breast skin a back skin flap comprising free skin and a neck skin flap comprising free skin, maintaining on said skin flaps substantially all of the subcutaneous membraneous tissue normally adjacent thereto, shaping said breast portion of flesh to form a cavity therein; removing from a turkey carcass a thigh portion of flesh while maintaining on said thigh its normally adhering skin and maintaining attached to and integral with said second-named adhering skin at least one skin flap comprising free skin, maintaining on said second-named skin flap substantially all of the subcutaneous membraneous tissue normally adjacent thereto, wrapping said second-named skin flap over said thigh with the inner portion of said skin flap and said subcutaneous tissue in contact therewith and thereby enveloping said thigh in skin, placing the thus enveloped thigh within the cavity of said whole breast portion of flesh, wrapping said back and neck skin flap of said whole breast portion over said whole breast with the inner portion of said skin flap and said subcutaneous tissue in contact therewith to substantially completely envelop said whole breast and maintaining said back and neck skin flaps compressed against said whole breast portion, and the inner surface of said whole breast portion compressed against said thigh portion.

5. A method of preparing a unitary boneless turkey roast which comprises removing from a turkey carcass a whole breast portion thereof while maintaining on said breast portion its normally adhering skin and maintaining attached to and integral with said adhering breast skin at least one skin flap comprising free skin, maintaining on said skin flap substantially all of the subcutaneous membraneous tissue normally adjacent thereto, and shaping said breast portion of flesh to form a cavity therein; removing from a turkey carcass a second portion of flesh while maintaining on said flesh its normally adhering skin and maintaining attached to and integral with said second-named adhering skin at least one skin flap comprising free skin, maintaining on said second-named skin flap substantially all of the subcutaneous membraneous tissue normally adjacent thereto, wrapping said second-named skin flap over said second portion with the inner portion of said skin flap and said subcutaneous tissue in contact therewith and thereby enveloping said second portion in skin, placing the thus enveloped second portion within the cavity of said whole breast portion of flesh, wrapping said first-named skin flap over said whole breast portion with the inner portion of said skin flap and said subcutaneous tissue in contact therewith to substantially completely envelope said whole breast portion, and maintaining said first-named skin flap compressed against said whole breast portion in a compact structure and heating said compact structure to effect cooking thereof and to effect adherence between said turkey portions.

References Cited by the Examiner
UNITED STATES PATENTS

| | | | |
|---|---|---|---|
| 2,571,544 | 10/51 | Cutrera | 99—107 X |
| 2,844,844 | 7/58 | Sieczkiewicz | 99—107 X |
| 2,916,381 | 12/59 | Jumenko | 99—107 |
| 2,922,718 | 1/60 | Saverslak | 99—107 |

A. LOUIS MONACELL, *Primary Examiner.*

HYMAN LORD, *Examiner.*